J. H. OESTERHAUS.
MEDICINE INJECTOR.
APPLICATION FILED APR. 8, 1919.
1,325,699.
Patented Dec. 23, 1919.
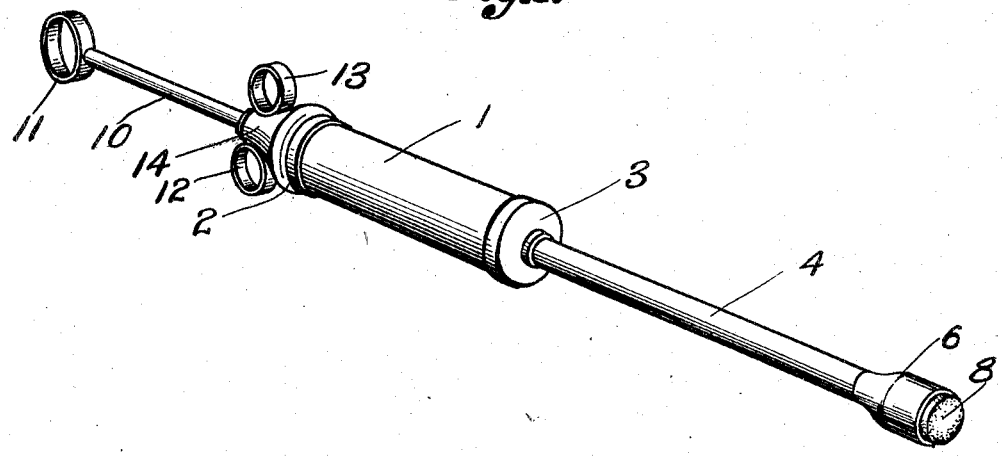
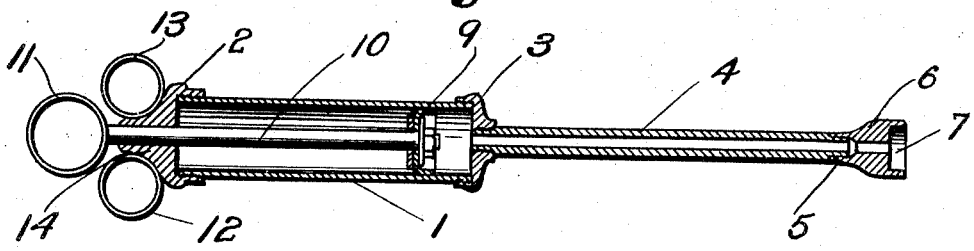
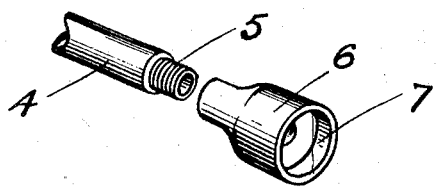
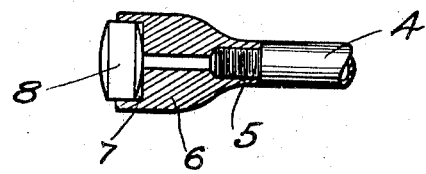
INVENTOR
John H. Oesterhaus,
BY
Arthur C. Brown
ATTORNEY

UNITED STATES PATENT OFFICE.

JOHN H. OESTERHAUS, OF KANSAS CITY, MISSOURI.

MEDICINE-INJECTOR.

1,325,699.     Specification of Letters Patent.     Patented Dec. 23, 1919.

Application filed April 8, 1919. Serial No. 288,531.

*To all whom it may concern:*

Be it known that I, JOHN H. OESTERHAUS, a citizen of the United States, residing at Kansas City, in the county of Jackson and State of Missouri, have invented certain new and useful Improvements in Medicine-Injectors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a medicine injector primarily for use by veterinarians for introducing remedies into the throat of animals, preferably below the base of the tongue to insure the reception thereof into the stomach of the animal. The difficulty of introducing remedial agents into the stomachs of animals is well known but I have found that if the remedy is introduced below the base of the tongue or adjacent thereto, the reception of the remedy by the animal will be assured.

I have, therefore, provided an injector adapted to receive the remedy preferably in solid form in such manner that it may be introduced into the throat adjacent to the base of the tongue and then discharged so that the animal will have to swallow it. The ejection of the remedy from the injector may be accompanied by a volume of water or other fluid to assist the remedy to reach the stomach.

In the drawings,

Figure I is a perspective view of a device constructed in accordance with my invention.

Fig. II is a vertical longitudinal sectional view through the same.

Fig. III is a fragmentary detail view of an injector tube with removable remedial receiving nozzle, and Fig. IV is a longitudinal sectional view showing the nozzle attached to the tube with the remedial troche or tablet in place.

One embodiment of my invention comprises a cylinder 1 provided with end caps 2 and 3, the cap 3 having connected thereto a tube 4 in communication with the cylinder 1 and having a restricted threaded end 5 to receive the internally threaded end of an ejector nozzle 6, having seats 7 to receive a tablet or remedial medicine 8. Within the cylinder 1 is a piston 9 adapted to be operated by a piston stem 10, the piston stem being controlled through the medium of the ring 11 complementary to the rings 12 and 13 on the end 14 of cap 2. When it is desired to introduce a remedial agent into the throat of an animal, the piston or plunger 9 will be caused to assume the position shown in Fig. II. The free end of the tube 4 will then be inserted in a suitable liquid as, for example, water, and the piston 9 will have a reciprocatory motion imparted to it away from the tube 4 so that the cylinder 1 may be partially filled with the liquid.

A suitable nozzle 6 may then be screwed upon the reduced end of the tube 4 to receive an appropriate remedial agent such as a tablet, troche or capsule whereupon the tube 4 may be introduced into the throat adjacent to the base of the tongue when the plunger 9 may be operated to eject the liquid in cylinder 1 in the form of a liquid piston which will dislodge the remedial agent from the nozzle 6 to cause the animal to swallow it.

It is to be understood that the device may be provided with a plurality of nozzles 6, having different diameters of seats or seats of different formation to accommodate different forms of remedial agents and I, therefore, do not wish to be limited to the particular form of nozzle shown, it being understood, however, that the seat 7 will generally be of greater diameter than the diameter of the orifice in tube 4.

From the foregoing it will be obvious that by changing the nozzle 6, the device will be applicable for injecting almost any form of remedial agent into the throat of an animal.

Having thus described my invention, what I claim as new therein, and desire to secure by Letters-Patent is:

1. In a device of the class described, a liquid ejecting cylinder, a tubular port connected to the discharge end thereof, and a remedy-receiving seat connected to the tubular port and having an opening communicating therewith.

2. In a device of the class described, a piston and cylinder, a tubular member carried by the cylinder, and a nozzle having a remedy-receiving seat, the tubular member being of less diameter than the cylinder whereby the cylinder may contain a charge of liquid to be ejected through the tubular member to dislodge the remedy from the seat.

In testimony whereof I affix my signature.

JOHN H. OESTERHAUS.